United States Patent [19]
Suska

[11] 3,764,188
[45] Oct. 9, 1973

[54] ANTI-FRICTION BEARING
[75] Inventor: Charles R. Suska, Roxbury, Conn.
[73] Assignee: The Stanley Works, New Britain, Conn.
[22] Filed: Nov. 19, 1971
[21] Appl. No.: 200,328

[52] U.S. Cl. .............................................. 308/187
[51] Int. Cl. ........................................... F16c 33/66
[58] Field of Search................... 308/.007, 188, 187

[56] References Cited
FOREIGN PATENTS OR APPLICATIONS
1,270,201  6/1961  France............................... 308/.007

Primary Examiner—Charles J. Myhre
Assistant Examiner—Frank Susko
Attorney—Granville M. Brumbaugh et al.

[57] ABSTRACT

An anti-friction bearing is made by replacing one or more of the conventional roller elements with TFE or FEP elements of the same size and shape. After a short break-in period, a thin anti-friction film or TFE or FEP will transfer onto the races and the other bearing elements and will be maintained throughout the life of the bearing by additional transfer from the fluoroplastic roller elements to preclude the surface coating from wearing through.

2 Claims, 1 Drawing Figure

PATENTED OCT 9 1973 3,764,188
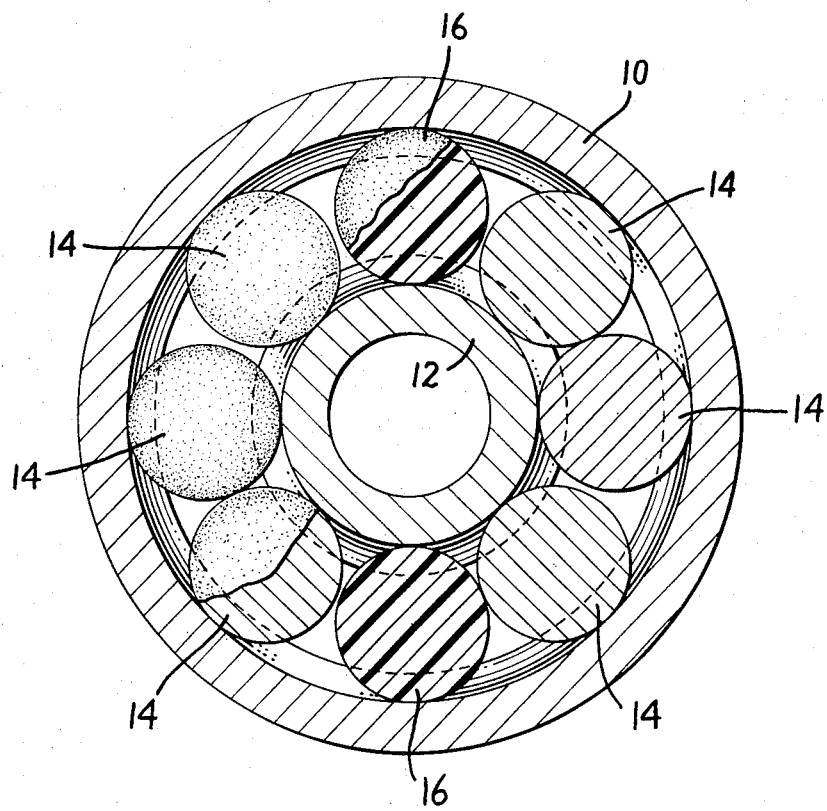
INVENTOR.
CHARLES R. SUSKA
BY
Brumbaugh, Graves, Donohue + Raymond
his ATTORNEYS

ANTI-FRICTION BEARING

BACKGROUND OF THE INVENTION

This invention relates to an improved low-friction bearing and, more particularly, to a method and apparatus for continuously providing a high-strength bearing with a surface coating of low-friction material.

The ideal low-friction bearing would be one which could be installed and thereafter forgotten. It would last as long as the apparatus in which it is installed and would require no maintenance whatsoever. It would be inexpensive to produce, and amenable to high-volume production. It would offer the same load-bearing capacity as present conventional bearings without an increase in size, and would provide quiet, friction-free operation for a much longer life.

Until now, the ideal bearing has never been approached. However, among the various attempts in the past to achieve the ideal bearing, the closest approximation has been the sealed bearing. A sealed bearing is one which is manufactured, lubricated, and sealed at the factory so that it need never be lubricated or otherwise maintained again.

Bearings are essentially of two varieties; the first is a conventional bearing using greases or oils having various additives designed to reduce the rate of lubricant deterioration and migration from the bearing. While these bearings are generally longer wearing and more trouble free than conventional bearings, their life is limited by the life of the lubricant. Eventually each known grease will dry, oxidize or otherwise deteriorate, or become contaminated, leaving the bearing without the proper quality of lubrication, and consequently with a shortened remaining life; or the lubricant may be washed out of the bearing causing premature failure.

The second variety of bearing is the TFE (polytetrafluoroethylene) coated bearing. TFE coated bearings have a thin layer of TFE on the bearing element or the raceways, or both, to provide low-friction contact therebetween. Initially, these bearings provide excellent performance and do not depend on the transitory life of conventional lubricants for their continued performance. They have not been widely accepted by the art, however, mainly because they are expensive to manufacture. In addition, the thin TFE coating eventually wears away and the resulting steel-to-steel contact swiftly destroys the bearing.

To correct this problem, it has been proposed to fabricate the roller elements of solid TFE. While this solution avoids the problem of wearing through of the TFE coating, the poor mechanical strength of the TFE roller elements drastically lowers the mechanical strength of the bearing.

The prior art, therefore, has yet to provide a bearing which approaches the requirements of the ideal bearing, namely low cost, ease of production, compact size, high compressive strength, long and quiet life, and no need for lubrication.

SUMMARY OF THE INVENTION

Accordingly, it is an object of this invention to provide a new and improved low-friction long-life bearing of relatively small size and strength, and which requires no maintenance.

Another object of the present invention is to provide a low-friction bearing which is as easy and inexpensive to produce and has the same size and practically the same load carrying capacity as conventional steel bearings, but which has a much longer life and requires no periodic maintenance.

These and other objects of this invention are attained by substituting for one or two, and in certain circumstances a greater number, of the conventional steel or other metal roller elements in a bearing, one or two transferable low-friction material roller elements including, for example, polytetrafluoroethylene (TFE) or fluoroinated ethylene propylene (FEP).

DESCRIPTION OF THE DRAWINGS

A more complete appreciation of this invention and other of its many attendant advantages will develop as it becomes better understood by reference to the following detailed description of an illustrative embodiment when read in connection with the accompanying drawing which shows an elevation, partly in section, of a conventional ball bearing in which two of its conventional steel balls have been replaced with two Teflon balls of the identical shape and size.

DESCRIPTION OF THE PREFERRED EMBODIMENT

Referring now to the drawing, a ball bearing is shown having a conventional pair of raceways 10 and 12 separated by a plurality of roller element such as ball bearings 14 formed of conventional high strength bearing material such as steel. Naturally, it will be understood that the invention, defined in the appended claims, is generally applicable to ball bearings, roller bearings, and needle bearings as well as any other type of bearings using rolling elements either existing at present or to be developed in the future. While it is considered desirable to seal this bearing to prevent entrance of abrasive foreign matter, it is not necessary to do so and more economical construction may be achieved for use in clean environments without sealing the bearing.

A TFE or FEP coating on the raceways and roller elements is established by replacing two of the conventional roller elements 14 with a like number of freely movable fluoroplastic elements 16 of identical size and shape as the original roller elements 14. One or two balls of TFE and FEP is preferable but a greater number of roller elements 14 could be replaced, according to the contemplated use, but in no event should more than one-third of the balls be replaced in order to retain the load carrying capacity of the bearing. If more than one roller element 16 is used, they should preferably be spaced at uniform distances in the raceway.

It is necessary that the fluoroplastic elements 16 be freely movable, that is, free to move with the other roller elements around the raceways. This free movement may be achieved within a cage, provided the cage is free to rotate relative to the raceways. Free movement is desirable for uniform transference and maintenance of the fluoroplastic coating, as explained hereinafter.

While solid TFE or FEP is used in the above described embodiment, it is also possible to fabricate the transferable low-friction material fluoroplastic elements 16 with a center core or some other material surrounded by fluoroplastic material or with a matrix of filaments or some other material extending therethrough for purposes of strength, durability, or manufacturing convenience. It is only necessary that there be a sufficient reservoir of fluoroplastic to establish and maintain the coating.

More specficially, the transferable low-friction material elements 16 may be solid TFE or FEP, or TFE or FEP with a center core of another material. The transferable low-friction material elements 16 may also be formed of materials such as delrin AF, a product of DuPont that is formed of about one-fifth TFE fibers and the balance acetal, and Fulton 404, a product of Liquid Nitrogen Products that is formed of about one-fifth TFE granules and the balance acetal. A still further material for the elements 16 is Gylon Lubetal Resin, a product of Garlock that is formed of fibrous flake TFE and an acetal resin.

The following theoretical explanation of the mechanism by which the invention is though to function is offered for the sake of clarification by explication of the disclosure rather than limitation in interpreting the claims appended hereafter.

Although the wear mechanism of fluoroplastics is not fully understood, it is generally thought that adhesion and the freeing of transferred wear fragments are of major importance. It is known that when TFE is rubbed against other materials a transfer takes place. It is believed that this wear process involves the laying down and then the removal of the transferred layers. When the metal part which has a reasonably smooth surface, e.g., 8 micro-inches, runs against a TFE part, the metal part acquires a coating of TFE so that the working interface is between TFE and TFE. As TFE particles wear off of the TFE part, they transfer to the metal part thereby maintaining the continuity of the film, provided the smoothness of the metal surface is within a suitable range. If the metal part is too rough, it would act as a rasp to rapidly remove TFE; if the metal part is too smooth, some investigators doubt that the transference occurs, but there is no general agreement on this point. In a ball-bearing application, commercially available balls might be too smooth for good transference, but as the raceways need not have the same finish as the balls it would be an improvement if the transferred film occurs primarily on the raceways. In other words, it should be better for transferred film to deposit on both the balls and the raceways, but if the balls are too smooth to cause good deposits, there would still be a lubricating film separating the metal balls from the metal raceways if the deposit can occur on the raceways.

The transference of TFE to the metal surface appears to be self-limiting, that is, once the TFE film has been established on the metal surfaces there is no further deposition, so the film does not become so thick as to interfere with the free movement of the bearing elements within the bearing. This phenomenon is probably due to an equal rate of transfer or wear fragments between TFE surfaces of the TFE part and the coated metal surfaces once the TFE film has been established. The system is therefore inherently economical in its use of the TFE material; only as much TFE will be used as is necessary to establish and maintain the film, and no more. Long bearing life is thus assured. The above explanation also holds true for FEP elements.

There are other low-friction materials which perform in somewhat the same manner as TFE as regards transference capability and improvement of the bearing surface in the absence of oil or grease. Among these materials are graphite, molybdeum disulphide, lead oxide, etc. A surface coating of these materials on the rolling elements and raceways improves bearing life when the oil or grease lubricant is no longer present, but the improvement would not be as great as for TFE and FEP.

Among the polymer materials, chlorotrifluoroethylene will function in the same manner as TFE and FEP. The particular characteristics desired in the low-friction material are good transference to the raceways and other balls, and low-friction characteristics between the surfaces so coated. It is expected that other materials will be developed in the future which will function similarly, and it is expressly contemplated that as improved materials are developed they may be substituted for the TFE, FEP and chlorotrifluoroethylene, used in the illustrated example. Accordingly, any material that exhibits low-friction and good transference characteristics, hereinafter referred to as "transferable low-friction material," can be used.

By replacing only one or two of the roller elements with freely movable roller elements formed of transferable low-friction material, the load bearing characteristics of the bearing are changed only slightly. The size and complexity of the bearing have not been increased at all and the manufacturing cost has not been significantly increased, but the wearing characteristics have been improved dramatically. By making the replacing elements 16 freely movable, the process of transference of the fluoroplastic film is greatly facilitated because the elements 16 are free to contact all bearing surfaces very early in the life of the bearing. Moreover, TFE or FEP is not wasted since only the bearing surfaces become coated, and after they are coated, transference of the fluoroplastic is sharply reduced.

In construction, the bearing is commonly assembled and lubricated with grease and then sealed. During this break-in period, that is, while the transferable low-friction material is being transferred from the roller elements 16 to the other roller elements and the raceways, the greese provides the customary good lubrication. By the time the grease has migrated from the bearing or dried or oxidized, the low-friction surface has already been established by transference in the presence of the lubricant and is ready to assume its lubricating function. As time passes, heavy use tends to wear down the low-friction surface layer. However, it is continually being replaced by the reservoir of transferable low-friction material which constitutes the replacing roller elements 16. The low-friction surface will thus last virtually indefinitely.

The illustrated embodiment interposes elements 16 between elements 14 so that elements 16 at all times occupy portions of that circumference between the raceways defined by the locus of points where the elements 14 contact each other. In this way, it is assured that there will be good transference of fluoroplastic from elements 16 to elements 14 and both raceways.

Obviously, numerous variations and modifications of the above described preferred embodiment or illustrative example, particularly described above, are possible in view of this disclosure and the prior art. It is expressly to be understood, therefore, that the invention may be practiced otherwise than as specifically described herein while remaining within the scope of the invention and claimed as follows:

1. A bearing, comprising:
   a pair of raceways having a surface smoothness of approximately eight micro-inches;

at least five freely movable roller elements disposed between and separating said raceways;

at least one but fewer than one-third of said roller elements being uniformly spaced around said raceways and formed of transferable low-friction material;

the other of said roller elements being formed of conventional high strength bearing material;

wherein the roller elements immediately adjacent each transferable low-friction material element are formed of conventional high strength bearing material;

whereby the transferable low-friction material will transfer from the roller element formed thereof to adjacent roller elements and raceway surfaces, and from there will retransfer to other roller elements and raceway surfaces so that all roller elements and raceway surfaces may be coated with the transferable low-friction material and a high number of roller elements of conventional high strength bearing material may be maintained for high bearing strength.

2. The bearing defined in claim 1, wherein all of said roller elements are of substantially the same size and shape, and said transferable low-friction material is selected from the group consisting of polytetrafluoroethylene, fluorinated ethylene propylene and chlorotrifluoroethylene.

* * * * *